(12) United States Patent
Hassan

(10) Patent No.: US 10,224,712 B2
(45) Date of Patent: Mar. 5, 2019

(54) CURRENT FLOW CONTROLLER

(71) Applicant: GENERAL ELECTRIC TECHNOLOGY GMBH, Baden (CH)

(72) Inventor: Fainan Hassan, Staffordshire (GB)

(73) Assignee: GENERAL ELECTRIC TECHNOLOGY GMBH, Baden (CH)

(*) Notice: Subject to any disclaimer, the term of this patent is extended or adjusted under 35 U.S.C. 154(b) by 0 days.

(21) Appl. No.: 15/326,396

(22) PCT Filed: Jul. 15, 2015

(86) PCT No.: PCT/EP2015/066176
§ 371 (c)(1),
(2) Date: Jan. 13, 2017

(87) PCT Pub. No.: WO2016/008927
PCT Pub. Date: Jan. 21, 2016

(65) Prior Publication Data
US 2017/0201094 A1    Jul. 13, 2017

(30) Foreign Application Priority Data

Jul. 16, 2014 (EP) .................................. 14275152

(51) Int. Cl.
*H02M 7/483* (2007.01)
*H02J 1/00* (2006.01)
(Continued)

(52) U.S. Cl.
CPC ................. *H02J 1/00* (2013.01); *H02J 3/36* (2013.01); *H02J 7/0068* (2013.01);
(Continued)

(58) Field of Classification Search
CPC ................. H02J 1/00; H02J 7/0068
See application file for complete search history.

(56) References Cited

U.S. PATENT DOCUMENTS 9,094,009 B2    7/2015 Grieshaber et al.

FOREIGN PATENT DOCUMENTS

EP    2 670 013 A1    12/2013
EP    2670013 A1 *  12/2013    ............... H02J 3/36
(Continued)

OTHER PUBLICATIONS

Marquardt R., "Modular Multilevel Converter : An Universal Concept for HVDC-networks and Extended DC-bus-applications," IEEE International Power Electronics Conference (IPEC), pp. 2, (Jun. 21-24, 2010).

(Continued)

*Primary Examiner* — Daniel Cavallari
(74) *Attorney, Agent, or Firm* — GE Global Patent Operation; Scott R. Stanley

(57) ABSTRACT

A current flow controller is provided, comprising first and second terminals operatively connectable to first and second DC power transmission media; a third terminal operatively connectable to an electrical element, the third terminal being electrically connected to each of the first and second terminals. A main switching element is operatively connected between the first and third terminals, the main switching element being switchable to turn on to permit flow of current between the third terminal and the first terminal and to turn off to inhibit flow of current between the third terminal and the first terminal. A current flow control module extends between the first and second terminals, the current flow control module including at least one auxiliary switching element and at least one energy storage device, the or each auxiliary switching element and the or each energy storage device combining to selectively provide a voltage source.

12 Claims, 11 Drawing Sheets

(51) Int. Cl.
*H02J 3/36* (2006.01)
*H02J 7/00* (2006.01)

(52) U.S. Cl.
CPC .... *H02M 7/483* (2013.01); *H02M 2007/4835* (2013.01); *Y02E 60/60* (2013.01)

(56) References Cited

FOREIGN PATENT DOCUMENTS

| FR | 2 980 315 A1 | 3/2013 |
|----|--------------|--------|
| WO | 2012037966 A1 | 3/2012 |
| WO | 2012037967 A1 | 3/2012 |
| WO | 2012/163841 A1 | 12/2012 |
| WO | 2013139392 A1 | 9/2013 |

OTHER PUBLICATIONS

Extended European Search Report and Opinion issued in connection with corresponding EP Application No. 14275152.8 dated Jan. 23, 2015.
International Search Report and Written Opinion issued in connection with corresponding PCT Application No. PCT/EP2015/066176 dated Oct. 26, 2015.
International Preliminary Report on Patentability issued in connection with corresponding PCT Application No. PCT/EP2015/066176 dated Jan. 17, 2017.
Veilleux et al., "Multi-Terminal HVDC Grid with Power Flow Controllability", Cigre, pp. 1-12, 2012.
Kim et al., "Modular Multilevel Converter Based on Full Bridge Cells for Multi-Terminal DC Transmission", 16th European Conference on Power Electronics and Applications, Lappeenranta, Finland, IEEE, pp. 1-10, Aug. 26-28, 2014.

\* cited by examiner

|  | Decrease $I_2$ (Increase $I_1$) | | Increase $I_2$ (Decrease $I_1$) | |
| --- | --- | --- | --- | --- |
|  | State 1 | State 2 | State 3 | State 4 |
| $T_1$ | OFF | OFF | OFF | OFF |
| $T_2$ | OFF | ON | OFF | ON |
| $T_3$ | OFF | OFF | OFF | OFF |
| $T_4$ | ON | OFF | ON | OFF |
| $Q_1$ | OFF | OFF | OFF | ON |
| $Q_2$ | ON | OFF | OFF | OFF |
| $Q_3$ | ON | OFF | OFF | OFF |
| $Q_4$ | OFF | OFF | OFF | ON |
| $V_C$ | Decreasing | Increasing | Increasing | Decreasing |
| $V_D = D.V_C$ | Positive | | Negative | |

Figure 3

CURRENT FLOW CONTROLLER

BACKGROUND

Embodiments of the invention relate to a current flow controller and to a current flow control circuit.

A DC electrical network may include a power source, such as a battery, that is connected to a load via one or more current-carrying conductors, or multiple power sources that are connected to multiple loads using a network of current-carrying conductors.

An example of a DC electrical network is a DC power grid that requires multi-terminal interconnection of HVDC converters, whereby power can be exchanged on the DC side using two or more HVDC converters electrically connected together. Each HVDC converter acts as either a source or sink to maintain the overall input-to-output power balance of the DC power grid whilst exchanging the power as required. The DC power grid relies on a network of DC power transmission lines or cables to achieve multi-terminal interconnection of the HVDC converters.

BRIEF DESCRIPTION

According to a first aspect of the invention, there is provided a current flow controller comprising first and second terminals being operatively connectable, in use, to first and second DC power transmission media respectively; a third terminal being operatively connectable, in use, to an electrical element (e.g. via a third DC power transmission medium), the third terminal being electrically connected to each of the first and second terminals; a main switching element, the main switching element being operatively connected between the first and third terminals, the main switching element being switchable to turn on to permit flow of current between the third terminal and the first terminal and to turn off to inhibit flow of current between the third terminal and the first terminal; a current flow control module extending between the first and second terminals, the current flow control module including at least one auxiliary switching element and at least one energy storage device, the or each auxiliary switching element and the or each energy storage device combining to selectively provide a voltage source, the or each auxiliary switching element being switchable to selectively switch the or each energy storage device into and out of circuit between the first and second terminals; and a control unit configured to control switching of the main and auxiliary switching elements in an energy transfer mode, wherein the control unit in the energy transfer mode turns off the main switching element and switches the or each energy storage device into circuit between the first and second terminals to inject a voltage drop, in use, in the first DC power transmission medium so as to divert energy from one of the DC power transmission media into the other of the DC power transmission media via the current flow control module and thereby carry out regulation of current flow in each DC power transmission medium.

A DC power transmission medium may be any medium that is capable of transmitting electrical power between two or more electrical elements. Such a medium may be, but is not limited to, a submarine DC power transmission cable, an overhead DC power transmission line or cable and an underground DC power transmission cable. Such an electrical element may be, but is not limited to, a DC power source, a load, a DC terminal of a DC power grid, or a DC electrical network.

During transmission of power through the first and second DC power transmission media, one of the first and second DC power transmission media may carry a higher current than the other of the first and second DC power transmission media due to, for example, a variation in conductor impedance between the DC power transmission media.

The inclusion of at least one voltage source in the current flow controller permits injection of a voltage drop in either of the first and second DC power transmission media. The injection of a voltage drop into the selected DC power transmission medium creates either a positive resistance effect in which the voltage drop opposes and thereby reduces the current flow in that DC power transmission medium, or a negative resistance effect in which the voltage drop contributes to an increase of the current flow in that DC power transmission medium.

In addition the interconnection of the first and second terminals via the current flow control module enables regulation of current flow in each DC power transmission medium to simultaneously decrease the flow of current in the one of the first and second DC power transmission media and increase the flow of current in the other of the first and second DC power transmission media. Moreover the interconnection of the first and second terminals via the current flow control module permits energy to be transferred between the first and second DC power transmission media via the current flow control module. Thus, during regulation of the current flows in the first and second DC power transmission media as set out above, energy is removed from the DC power transmission medium that is undergoing a reduction in current flow and this energy is diverted, via the current flow control module, into the other DC power transmission medium that is undergoing an increase in current flow.

Furthermore the configuration of the components of the current flow controller according to the invention, as set out above, results in a smaller, simpler and more cost-effective current flow controller that requires less switching elements than a current flow controller that is configured to inject a voltage drop in each of the DC power transmission media so as to divert energy from one of the DC power transmission media into the other of the DC power transmission media via the current flow control module and thereby carry out regulation of current flow in each DC power transmission medium.

In embodiments of the invention, the current flow controller may include first and second main switching elements, the first main switching element being operatively connected between the first and third terminals, the second main switching element being operatively connected between the second and third terminals, each main switching element being switchable to turn on to permit flow of current between the third terminal and the corresponding one of the first and second terminals and to turn off to inhibit flow of current between the third terminal and the corresponding one of the first and second terminals. In such an embodiment the control unit in the energy transfer mode may turn off one of the main switching elements, turn on the other of the main switching elements and switch the or each energy storage device into circuit between the first and second terminals to inject a voltage drop, in use, in one of the DC power transmission media so as to divert energy from one of the DC power transmission media into the other of the DC power transmission media via the current flow control module and thereby carry out regulation of current flow in each DC power transmission medium.

The inclusion of the first and second main switching elements in the current flow controller increases the number of configurations of the main and auxiliary switching elements that allows the current flow controller to perform the abovementioned energy diversion and current flow regulation operations, thus enhancing the reliability of the current flow controller.

The current flow controller according to the invention may be configured to form a multi-port current flow controller that is capable of carrying out regulation of current flows in more than two (e.g. three, four, five, and so on) DC power transmission media.

For example, in further embodiments of the invention, the current flow controller may further include at least one additional terminal being operatively connectable, in use, to an additional DC power transmission medium, the third terminal being electrically connected to the or each additional terminal. The current flow control module may extend between the first, second and additional terminals, the or each auxiliary switching element being switchable to selectively switch the or each energy storage device into and out of circuit between the first, second and additional terminals. The control unit in the energy transfer mode may turn off the main switching element and switch the or each energy storage device into circuit between the first, second and additional terminals to inject a voltage drop, in use, in the first DC power transmission medium so as to divert energy from at least one of the DC power transmission media into at least one other of the DC power transmission media via the current flow control module and thereby carry out regulation of current flow in each DC power transmission medium.

In such embodiments the current flow controller may include at least one additional main switching element, the or each additional main switching element being operatively connected between the third terminal and the corresponding additional terminal, the or each additional main switching element being switchable to turn on to permit flow of current between the third terminal and the corresponding additional terminal and to turn off to inhibit flow of current between the third terminal and the corresponding additional terminal. The control unit in the energy transfer mode may turn off at least one of the main switching elements, turn on at least one other of the main switching elements and switch the or each energy storage device into circuit between at least two of the first, second and additional terminals to inject a voltage drop, in use, in at least one of the DC power transmission media so as to divert energy from at least one of the DC power transmission media into at least one other of the DC power transmission media via the current flow control module and thereby carry out regulation of current flow in each DC power transmission medium.

The inclusion of the or each additional terminal and the or each additional main switching element not only enables the current flow controller to carry out regulation of current flows in more than two DC power transmission media, but also further increases the number of configurations of the main and auxiliary switching elements that allows the current flow controller to perform the abovementioned energy diversion and current flow regulation operations, thus further enhancing the reliability of the current flow controller.

The current flow controller may be in constant operation to carry out continuous regulation of the current flows in the DC power transmission media, or may be operated intermittently to regulate the current flows in the DC power transmission media.

The current flow controller according to the invention therefore permits dynamic, selective control over current flow in each of the DC power transmission media through injection of a voltage drop in the first DC power transmission media or at least one of the DC power transmission media. Such control over current flow in each DC power transmission medium may be beneficial in that current flow in each DC power transmission medium may be controlled within a specific operating range to improve the power transmission performance of the DC power transmission media.

The ability to modify the current flows in the DC power transmission media through injection of a voltage drop in the first DC power transmission media or at least one of the DC power transmission media may be used to regulate the current flows in order to minimise dissipation losses and reduce the risk of each DC power transmission medium exceeding its thermal rating. In an embodiment, regulation of current flow in each DC power transmission medium includes balancing the flows of current in the DC power transmission media.

In addition the use of the current flow controller results in an energy-efficient manner of regulating the current flows in the DC power transmission media. This is because, as set out above, the diversion of energy during regulation of current flow in each DC power transmission medium involves transferring energy that is removed from one DC power transmission medium to another DC power transmission medium. This thereby obviates the need for additional energy sources to add energy into a DC power transmission medium and the need for additional energy sinks such as storage capacitors or dissipation resistors to store or dissipate energy that is removed from a DC power transmission medium, when increasing or decreasing current flow in each DC power transmission medium. The use of additional energy sources and sinks would add significant cost, size and weight to the plurality of DC power transmission media. Moreover, the use of dissipation resistors would not only increase dissipation losses in the current flow controller, but also might require the use of a cooling system, which would increase the overall complexity of the current flow controller.

Moreover the manner in which the voltage drop is injected into the DC power transmission medium means that the energy storage device may only be required to have a low voltage rating, rather than a voltage rating corresponding to the voltage across a DC power transmission medium and ground.

Furthermore, the use of the current flow controller in regulating current flow in each DC power transmission medium may be carried out independently of the operation of the electrical elements at either end of each DC power transmission medium. This removes the need to redesign the control procedure for the electrical elements in order to accommodate a need for regulation of current flow in each DC power transmission medium.

The voltage drop may be variable. The voltage drop may also be a positive or negative DC voltage drop.

The use of a variable voltage drop permits regulation of current flow in each DC power transmission medium that is undergoing variable current flow conditions.

Optionally regulation of current flow in each DC power transmission medium may include limiting the flow of current in one of the DC power transmission media. Further optionally regulation of current flow in each DC power transmission medium may include reducing the flow of current in one of the DC power transmission media to zero.

To carry out its current flow regulation duties, the current flow controller may be arranged to have different configurations, some examples of which are as follows.

In embodiments of the invention the or each auxiliary switching element and the or each energy storage device may combine to selectively provide a unidirectional or bidirectional voltage source.

The current flow control module may be a unidirectional current flow control module that is able to divert energy in one direction only between the DC power transmission media. For example, in embodiments of the invention, the or each auxiliary switching element and the or each energy storage device may combine to selectively provide a unidirectional voltage source.

Alternatively the current flow control module may be a bidirectional current flow control module that is able to divert energy in both directions between the DC power transmission media. For example, in other embodiments of the invention, the or each auxiliary switching element and the or each energy storage device may combine to selectively provide a bidirectional voltage source.

A bidirectional current flow control module is useful when energy diversion is required in one direction for one set of current flow conditions and in the other direction for another set of current flow conditions.

When the or each auxiliary switching element and the or each energy storage device combine to selectively provide a bidirectional voltage source, the control unit when in the energy transfer mode may be configured to control switching of the main and auxiliary switching elements to selectively charge and discharge the or each energy storage device and thereby regulate an energy level of the or each energy storage device. As such the current flow control module is able to maintain the energy level of the or each energy storage device at a preferred operating level or within a preferred operating range. This not only enables the current flow control module to operate for as long as desired, but also obviates the need for additional equipment to charge and/or discharge the or each energy storage device whenever the energy level of the or each energy storage device deviates from the preferred operating level or operating range.

In embodiments of the invention the current flow control module may include a plurality of auxiliary switching elements, the plurality of auxiliary switching elements and the or each energy storage device being connected in a bridge arrangement, such as a full-bridge or half-bridge arrangement.

In such embodiments of the invention the current flow control module may include a plurality of auxiliary switching elements and an energy storage device, and the plurality of auxiliary switching elements are connected in parallel with the energy storage device in a full-bridge arrangement to define a 4-quadrant bipolar module that can provide a negative, zero or positive voltage and can conduct current in two directions.

The plurality of auxiliary switching elements may include first and second pairs of auxiliary switching elements and may include at least one additional pair of auxiliary switching elements, and each pair of auxiliary switching elements may be connected in parallel with the energy storage device in the bridge arrangement. The or each additional pair of auxiliary switching elements provides the current flow control module with a means for switching the or each energy storage device into and out of circuit between the first, second and additional terminals. The number of additional pairs of auxiliary switching elements may vary depending on the number of additional terminals in the current flow controller.

In other such embodiments of the invention the current flow control module may include a plurality of auxiliary switching elements and an energy storage device, and the plurality of auxiliary switching elements may be connected in parallel with the energy storage device in a half-bridge arrangement to define a 4-quadrant bipolar module that can provide a negative, zero or positive voltage and can conduct current in two directions. In such embodiments, the 4-quadrant operation of the current flow control module may be carried out through reversal of the output voltage of the energy storage device.

Each energy storage device may be, for example, a capacitor, a fuel cell, a battery or any other energy storage device capable of storing and releasing its electrical energy to provide a voltage.

The or each main switching element and the or each auxiliary switching element of the current flow control module may be or may include a semiconductor device that is, for example, an insulated gate bipolar transistor, a gate turn-off thyristor, a field effect transistor, an injection enhanced gate transistor, an integrated gate commutated thyristor, or any other self-commutated semiconductor device connected in series or in parallel.

The use of one or more thyristors in the or each main switching element provides the or each main switching element with robustness and low conduction loss. In addition, when the or each main switching element includes at least one force-commutated switching device, the control unit may be configured to control switching of the or each auxiliary switching element of the current flow control module to perform forced-commutation of the or each force-commutated switching device (e.g. one or more thyristors) in the or each main switching element.

The above semiconductor devices may, for example, each be connected in parallel with an anti-parallel passive current check element. A passive current check element is any device that permits current flow in only one direction, e.g. a diode.

The or each main switching element may be a bidirectional switching element.

The or each main switching element may be configured to form a short circuit upon its failure. Such configuration of the or each main switching element ensures that the failure of the or each main switching element does not result in interruption of current in any of the first and second DC power transmission media.

According to a second aspect of the invention, there is provided a current flow control circuit comprising first and second DC power transmission media for connection to an electrical element or to respective electrical elements; and a current flow controller as described above, wherein the first and second terminals are operatively connected, in use, to the first and second DC power transmission media respectively.

The current flow controller and the current flow control circuit according to the invention are applicable to low-voltage, medium-voltage and high-voltage DC applications that require transmission of DC power between two electrical elements via two or more DC power transmission media.

The current flow controller and the current flow control circuit according to the invention are applicable to different DC electrical circuits having different numbers of electrical elements and DC power transmission media, and different topologies of the plurality of DC power transmission media to interconnect the electrical elements. Such a DC electrical network may be, but is not limited to, a mesh-connected DC power grid or a radial-connected DC power grid.

BRIEF DESCRIPTION OF THE DRAWINGS

Embodiments of the invention will now be described, by way of non-limiting examples, with reference to the accompanying drawings in which:

FIGS. 3, 4, 5, 6, and 7 shows, in table and schematic form, four states of the main and auxiliary switching elements in the energy transfer mode of a current flow controller forming part of the current flow control circuit of FIG. 1;

DETAILED DESCRIPTION

Figure 1:
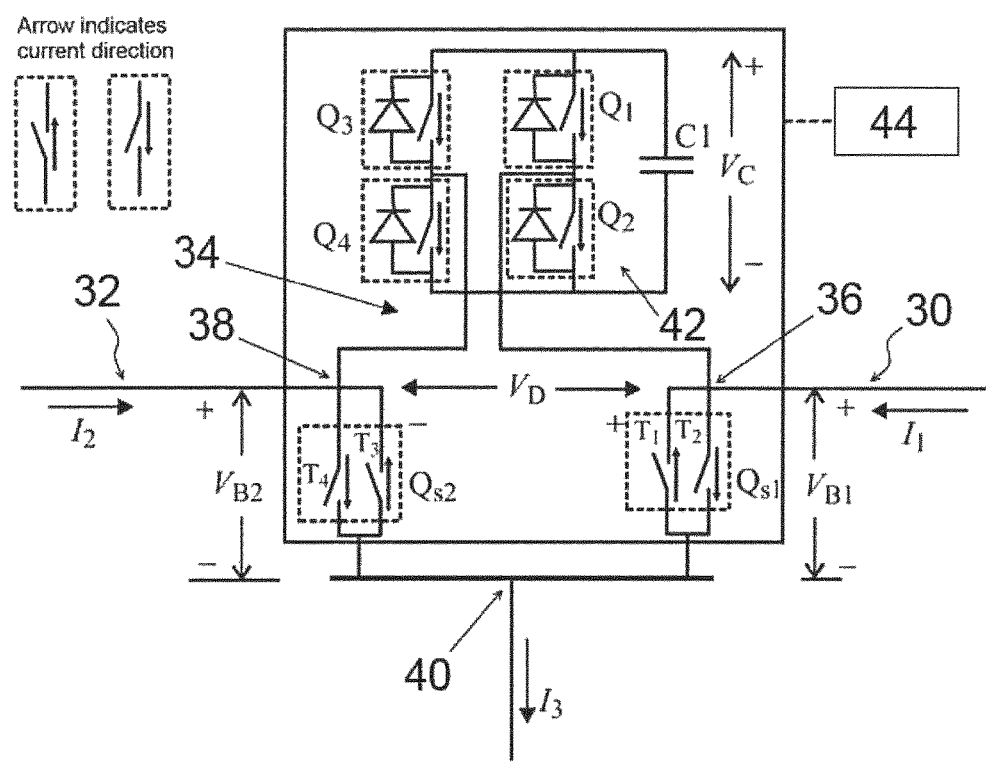
FIG. 1 shows, in schematic form, a current flow control circuit according to a first embodiment of the invention.

A current flow control circuit according to a first embodiment of the invention is shown in FIG. 1.

The current flow control circuit comprises first and second DC power transmission lines 30,32 and a current flow controller 34.

The current flow controller comprises first, second and third terminals 36, 38, 40, first and second main switching elements $Q_{s1}$, $Q_{s2}$, a current flow control module 42 and a control unit 44.

The first DC power transmission line 30 is operatively connected at one end to the first terminal 36 and is operatively connected at the other end to a first electrical element (not shown).

The second DC power transmission line 32 is operatively connected at one end to the second terminal 38 and is operatively connected at the other end to a second electrical element (not shown). The third terminal 40 is operatively connected to a third electrical element (not shown). Examples of electrical elements are described elsewhere in this specification.

The third terminal 40 is further electrically connected to each of the first and second terminals 36,38. More specifically, in the embodiment shown, the first main switching element $Q_{s1}$ is operatively connected between the first and third terminals 36,40, and the second main switching element $Q_{s2}$ is operatively connected between the second and third terminals 38,40.

Each of the first and second main switching elements $Q_{s1}$, $Q_{s2}$ is in the form of a bidirectional switching element that includes a pair of anti-parallel connected thyristors $T_1$, $T_2$, $T_3$, $T_4$. Each main switching element $Q_{s1}$, $Q_{s2}$ is configured to form a short circuit upon its failure, such that failure of each main switching element $Q_{s1}$, $Q_{s2}$ does not prevent the flow of current between the third terminal 40 and the corresponding one of the first and second terminals 36,38.

In use, the first main switching element $Q_{s1}$ is switchable to turn on to permit flow of current between the third terminal 40 and the first terminal 36 and to turn off to inhibit flow of current between the third terminal 40 and the first terminal 36, and the second main switching element $Q_{s2}$ is switchable to turn on to permit flow of current between the third terminal 40 and the second terminal 38 and to turn off to inhibit flow of current between the third terminal 40 and the second terminal 38.

It is envisaged that, in other embodiments, each bidirectional switching element may be replaced by another type of switching element, examples of which are described elsewhere in this specification.

The current flow control module 42 extends between the first and second terminals 36,38. In the embodiment shown, the current flow control module 42 includes a plurality of auxiliary switching elements $Q_1$, $Q_2$, $Q_3$, $Q_4$ and an energy storage device in the form of a capacitor C1. Each of the auxiliary switching elements $Q_1$, $Q_2$, $Q_3$, $Q_4$ is constituted by a semiconductor device in the form of an Insulated Gate Bipolar Transistor (IGBT). Each of the auxiliary switching elements also includes an anti-parallel diode connected in parallel therewith.

It is envisaged that, in other embodiments, each IGBT may be replaced by another type of switching element, examples of which are described elsewhere in this specification. It is also envisaged that, in other embodiments, the capacitor may be replaced by another type of energy storage device, examples of which are described elsewhere in this specification.

The plurality of auxiliary switching elements $Q_1$, $Q_2$, $Q_3$, $Q_4$ are in the form of two pairs of auxiliary switching elements $Q_1$, $Q_2$, $Q_3$, $Q_4$ that are connected in parallel with the capacitor C1 in a full-bridge arrangement to define a 4-quadrant bipolar module 42 that can provide a negative, zero or positive voltage and can conduct current in two directions.

In use, the capacitor C1 of the current flow control module 42 is selectively switched into and out of circuit between the first and second terminals by changing the state of the auxiliary switching elements $Q_1$, $Q_2$, $Q_3$, $Q_4$.

The capacitor C1 is switched out of circuit between the first and second terminals 36,38 when the auxiliary switching elements $Q_1$, $Q_2$, $Q_3$, $Q_4$ are configured to form a short circuit that bypasses the capacitor C1. This causes a current passing between the first and second terminals 36,38 to pass through the short circuit and bypass the capacitor C1, and so in this manner the current flow control module 42 injects a zero voltage drop across the first and second terminals 36,38.

The capacitor C1 is switched into circuit between the first and second terminals 36,38 when the auxiliary switching elements $Q_1$, $Q_2$, $Q_3$, $Q_4$ are configured to allow a current flowing between the first and second terminals 36,38 to flow into and out of the capacitor C1. The capacitor C1 then charges or discharges its stored energy so as to provide a non-zero voltage drop across the first and second terminals 36,38. The auxiliary switching elements $Q_1$, $Q_2$, $Q_3$, $Q_4$ may be configured to switch the capacitor C1 into circuit between the first and second terminals 36,38 in either forward or reverse directions so as to inject a positive or negative voltage drop across the first and second terminals 36,38.

In this manner the plurality of auxiliary switching elements $Q_1$, $Q_2$, $Q_3$, $Q_4$ and the capacitor C1 combine to selectively provide a voltage source, and the plurality of auxiliary switching elements $Q_1$, $Q_2$, $Q_3$, $Q_4$ are switchable to selectively switch the capacitor C1 into and out of circuit between the first and second terminals 36,38 so as to provide a voltage drop across the first and second terminals 36,38.

It is envisaged that, in other embodiments of the invention, the plurality of auxiliary switching elements may be connected in parallel with the capacitor in a half-bridge arrangement to define a 4-quadrant bipolar module that can provide a negative, zero or positive voltage and can conduct current in two directions. In such embodiments, the 4-quadrant operation of the current flow control module may be carried out through reversal of the output voltage of the capacitor.

The control unit 44 is configured to control switching of the main and auxiliary switching elements $Q_{s1}$, $Q_{s2}$, $Q_1$, $Q_2$, $Q_3$, $Q_4$, i.e. to turn on and off each of the main and auxiliary switching elements $Q_{s1}$, $Q_{s2}$, $Q_1$, $Q_2$, $Q_3$, $Q_4$.

Operation of the current flow controller 34 is described as follows, with reference to FIGS. 2 to 7.

Figure 2:
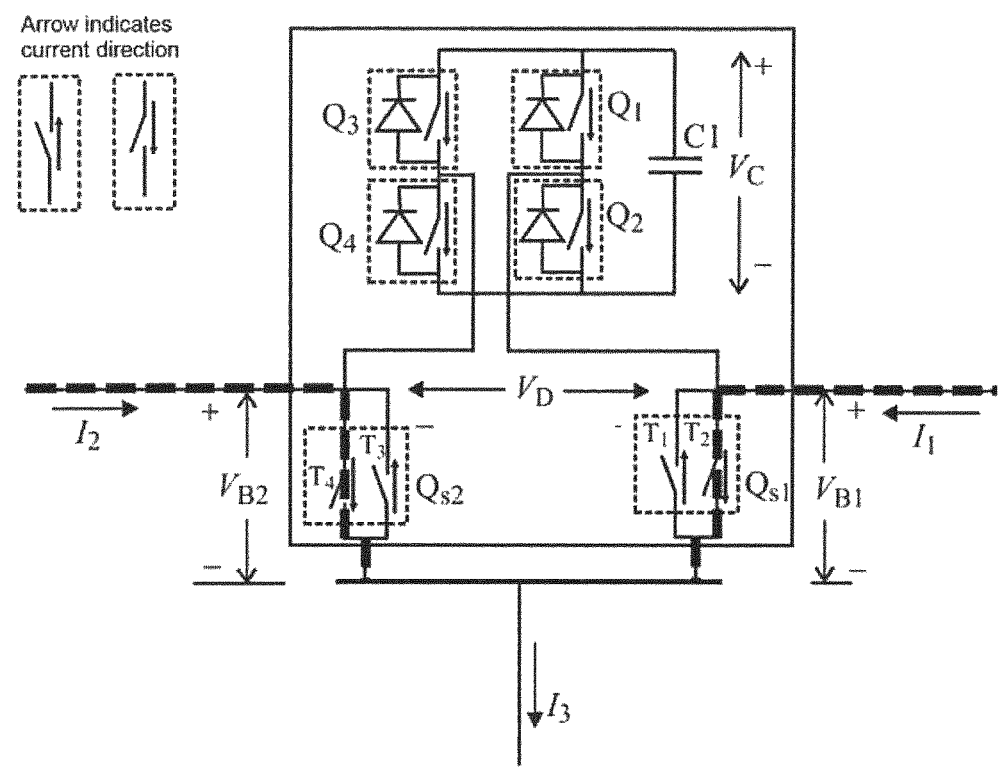
FIG. 2 shows, in schematic form, the normal operation of the current flow control circuit of FIG. 1.

During normal operation of the current flow control circuit, current $I_1$, $I_2$ flows in both of the first and second DC transmission lines 30,32, as shown in FIG. 2. The control unit 44 turns on the first and second main switching elements $Q_{s1}$, $Q_{s2}$ to permit flow of current between the third terminal 40 and each of the first and second terminals 36,38. Meanwhile the control unit 44 switches the auxiliary switching elements $Q_1$, $Q_2$, $Q_3$, $Q_4$ to inhibit flow of current between the first and second terminals 36,38.

During transmission of power through the first and second DC power transmission lines 30,32, one of the first and second DC power transmission lines 30,32 may carry a higher current than the other of the first and second DC power transmission lines 30,32 due to, for example, a variation in conductor impedance between the DC power transmission lines 30,32.

Balancing the flows of current $I_1$, $I_2$ in the first and second DC power transmission lines 30,32 requires a decrease in the flow of current $I_1$, $I_2$ in the DC power transmission line 30,32 carrying the higher current, and a corresponding increase in the flow of current $I_1$, $I_2$ in the other DC power transmission line 30,32. It will be appreciated that the current flow controller 34 may be operated to decrease the flow of current $I_1$, $I_2$ in the DC power transmission line 30,32 carrying the higher current, and increase the flow of current $I_1$, $I_2$ in the other DC power transmission line 30,32, without balancing the flows of current $I_1$, $I_2$ in the first and second DC power transmission lines 30,32.

In order to achieve the aforementioned balancing, the control unit 44 controls switching of the main and auxiliary switching elements $Q_{s1}$, $Q_{s2}$, $Q_1$, $Q_2$, $Q_3$, $Q_4$ in an energy transfer mode. More specifically, the control unit 44 in the energy transfer mode turns off one of the first and second main switching elements $Q_{s1}$, $Q_{s2}$, turns on the other of the first and second main switching elements $Q_{s1}$, $Q_{s2}$, and switches the capacitor C1 into circuit between the first and second terminals 36,38 to inject a voltage drop $V_D$ across the first and second terminals 36,38. Switching of the main and auxiliary switching elements $Q_{s1}$, $Q_{s2}$, $Q_1$, $Q_2$, $Q_3$, $Q_4$ in this manner permits injection of the voltage drop $V_D$ in either of the first and second DC power transmission lines 30,32 so as to divert energy from one of the first and second DC power transmission lines 30,32 into the other of the first and second DC power transmission lines 30,32 via the current flow control module 42.

The injection of a voltage drop $V_D$ into the selected DC power transmission line 30,32 creates either a positive resistance effect in which the voltage drop $V_D$ opposes and thereby reduces the current flow in that DC power transmission line 30,32, or a negative resistance effect in which the voltage drop $V_D$ contributes to an increase of the current flow in that DC power transmission line 30,32.

FIG. 3 shows, in table form, four states of the main and auxiliary switching elements $Q_{s1}$, $Q_{s2}$, $Q_1$, $Q_2$, $Q_3$, $Q_4$ in the energy transfer mode of the current flow controller 34 of FIG. 1.

Figure 4:
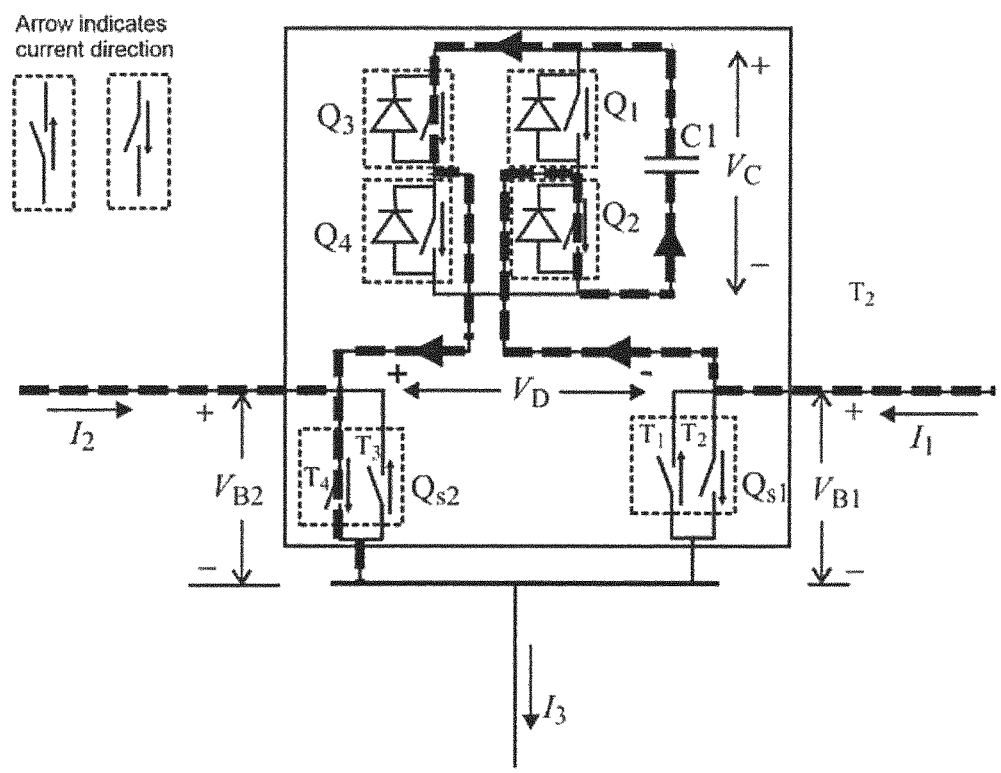

In a first state of the main and auxiliary switching elements $Q_{s1}$, $Q_{s2}$, $Q_1$, $Q_2$, $Q_3$, $Q_4$ in the energy transfer mode (as shown in FIG. 4), the first main switching element $Q_{s1}$ is turned off, the second main switching element $Q_{s2}$ is turned on, and the auxiliary switching elements $Q_1$, $Q_2$, $Q_3$, $Q_4$ are switched to inject a voltage drop $V_D$ across the first and second terminals 36,38 and thereby in the first DC power transmission line 30. This creates a negative resistance effect in which the voltage drop $V_D$ contributes to an increase of the current flow in the first DC power transmission line 30. Consequently the first DC power transmission line 30 experiences an increase in current flow, the second DC power transmission line 32 experiences a decrease in current flow, and energy is diverted from the second DC power transmission line 32 to the first DC power transmission line 30 via the current flow control module 42. Meanwhile the first state of the main and auxiliary switching elements $Q_{s1}$, $Q_{s2}$, $Q_1$, $Q_2$, $Q_3$, $Q_4$ results in discharging of the capacitor C1.

Figure 5:
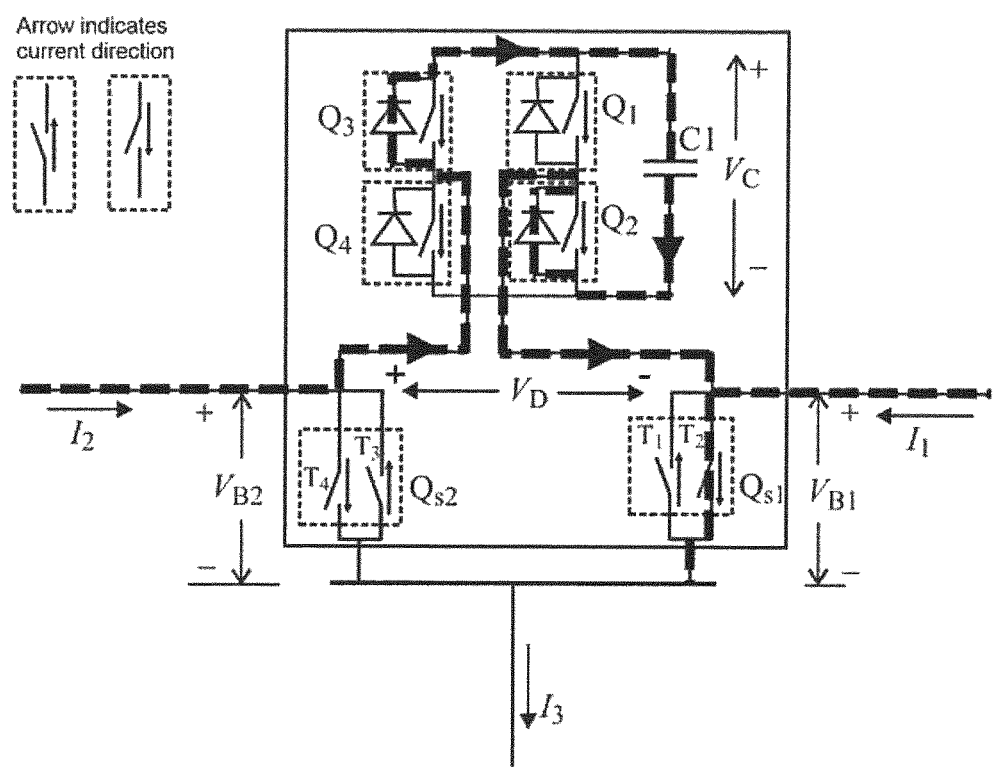

In a second state of the main and auxiliary switching elements $Q_{s1}$, $Q_{s2}$, $Q_1$, $Q_2$, $Q_3$, $Q_4$ in the energy transfer mode (as shown in FIG. 5), the first main switching element $Q_{s1}$ is turned on, the second main switching element $Q_{s2}$ is turned off, and the auxiliary switching elements $Q_1$, $Q_2$, $Q_3$, $Q_4$ are switched to inject a voltage drop $V_D$ across the first and second terminals 36,38 and thereby in the second DC transmission line 32. This creates a positive resistance effect in which the voltage drop $V_D$ opposes and thereby reduces the current flow in the second DC power transmission line 32. Consequently the first DC power transmission line 30 experiences an increase in current flow, the second DC power transmission line 32 experiences a decrease in current flow, and energy is diverted from the second DC power transmission line 32 to the first DC power transmission line 30 via the current flow control module 42. Meanwhile the second state of the main and auxiliary switching elements $Q_{s1}$, $Q_{s2}$, $Q_1$, $Q_2$, $Q_3$, $Q_4$ results in charging of the capacitor C1.

It can be seen from the above first and second states that the control unit 44 when in the energy transfer mode can control switching of the main and auxiliary switching elements $Q_{s1}$, $Q_{s2}$, $Q_1$, $Q_2$, $Q_3$, $Q_4$ to selectively charge and discharge the capacitor C1 whilst enabling diversion of energy from the second DC power transmission line 32 to the first DC power transmission line 30 via the current flow control module 42 and regulating current flow in the first and second DC power transmission lines 30,32. Such selective charging and discharging of the capacitor C1 can be used to regulate the energy level of the capacitor C1 without affecting the aforementioned energy diversion and current regulation operations.

Figure 6:
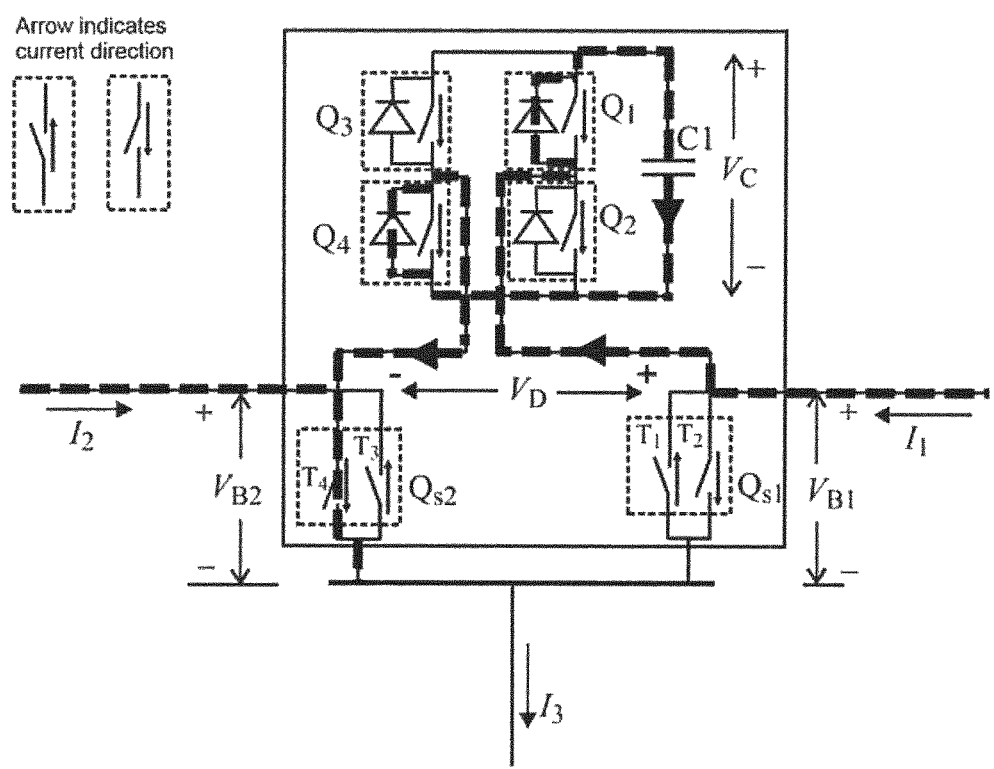

In a third state of the main and auxiliary switching elements $Q_{s1}$, $Q_{s2}$, $Q_1$, $Q_2$, $Q_3$, $Q_4$ in the energy transfer mode (as shown in FIG. 6), the first main switching element $Q_{s1}$ is turned off, the second main switching element $Q_{s2}$ is turned on, and the auxiliary switching elements $Q_1$, $Q_2$, $Q_3$, $Q_4$ are switched to inject a voltage drop $V_D$ across the first and second terminals 36,38 and thereby in the first DC transmission line 30. This creates a positive resistance effect in which the voltage drop $V_D$ opposes and thereby reduces the current flow in the first DC power transmission line 30. Consequently the first DC power transmission line 30 experiences a decrease in current flow, the second DC power transmission line 32 experiences an increase in current flow, and energy is diverted from the first DC power transmission line 30 to the second DC power transmission line 32 via the current flow control module 42. Meanwhile the third state of the main and auxiliary switching elements $Q_{s1}$, $Q_{s2}$, $Q_1$, $Q_2$, $Q_3$, $Q_4$ results in charging of the capacitor C1.

Figure 7:
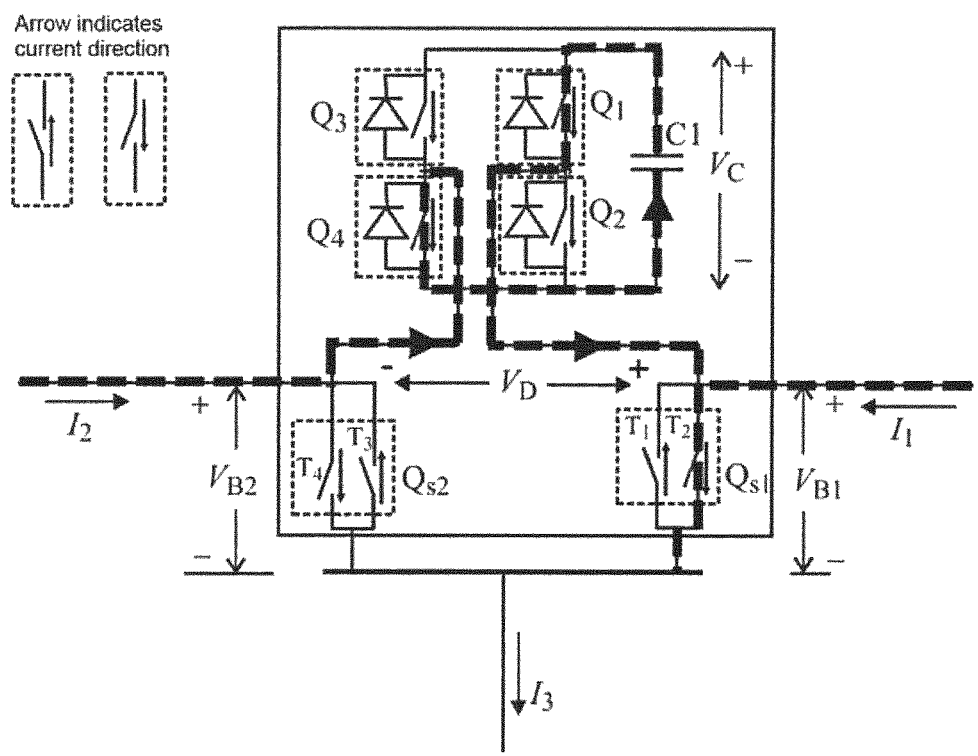

In a fourth state of the main and auxiliary switching elements $Q_{s1}$, $Q_{s2}$, $Q_1$, $Q_2$, $Q_3$, $Q_4$ in the energy transfer mode (as shown in FIG. 7), the first main switching element $Q_{s1}$ is turned on, the second main switching element $Q_{s2}$ is turned off, and the auxiliary switching elements $Q_1$, $Q_2$, $Q_3$, $Q_4$ are switched to inject a voltage drop $V_D$ across the first and second terminals and thereby in the second DC transmission line 32. This creates a negative resistance effect in which the voltage drop $V_D$ contributes to an increase of the current flow in the second DC power transmission line 32. Consequently the first DC power transmission line 30 experiences a decrease in current flow, the second DC power transmission line 32 experiences an increase in current flow, and energy is diverted from the first DC power transmission line 30 to the second DC power transmission line 32 via the current flow control module 42. Meanwhile the fourth state of the main and auxiliary switching elements $Q_{s1}$, $Q_{s2}$, $Q_1$, $Q_2$, $Q_3$, $Q_4$ results in discharging of the capacitor C1.

Similarly it can be seen from the above third and fourth states that the control unit 44 when in the energy transfer mode can control switching of the main and auxiliary switching elements $Q_{s1}$, $Q_{s2}$, $Q_1$, $Q_2$, $Q_3$, $Q_4$ to selectively charge and discharge the capacitor whilst enabling diversion of energy from the first DC power transmission line 30 into the second DC power transmission line 32 via the current flow control module 42 and regulating current flow in the first and second DC power transmission lines 30,32.

The ability to modify the current flows in the first and second DC power transmission lines 30,32 through injection of a voltage drop $V_D$ in either of the first and second DC power transmission lines 30,32 may be used to regulate the current flows in order to minimise dissipation losses and reduce the risk of each DC power transmission line 30,32 exceeding its thermal rating.

The current flow controller 34 of FIG. 1 therefore permits dynamic, selective control over current flow in each of the first and second DC power transmission lines 30,32 through injection of a voltage drop $V_D$ in either of the first and second DC power transmission lines 30,32. Such control over current flow in each DC power transmission line 30,32 may be beneficial in that current flow in each DC power transmission line 30,32 may be controlled within a specific operating range to improve the power transmission performance of the first and second DC power transmission lines 30,32.

The configuration of the components of the current flow controller 34 of FIG. 1 results in a smaller, simpler and more cost-effective current flow controller 34 that requires less switching elements than a current flow controller that is configured to inject a voltage drop in each of the DC power transmission lines 30,32 so as to divert energy from one of the first and second DC power transmission lines 30,32 into the other of the first and second DC power transmission lines 30,32 via the current flow control module and thereby carry out regulation of current flow in each DC power transmission line 30,32.

Figure 8:
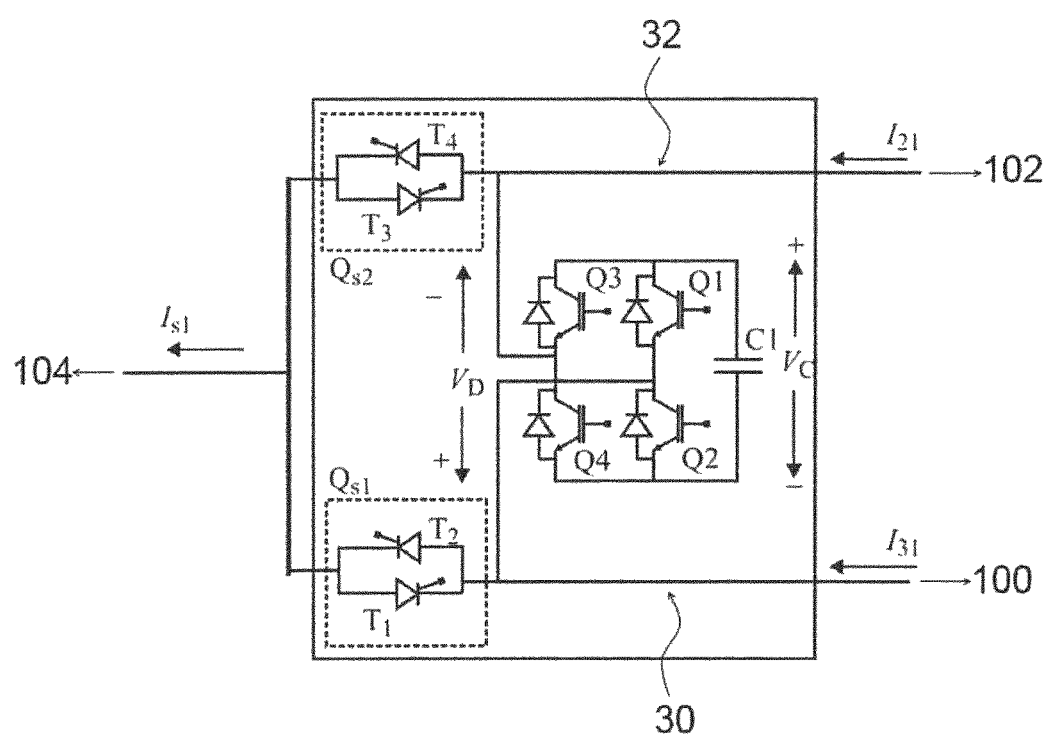
FIGS. 8 and 9 show, in schematic form, a simulation model of the current flow control circuit of FIG. 1.
Figure 9:
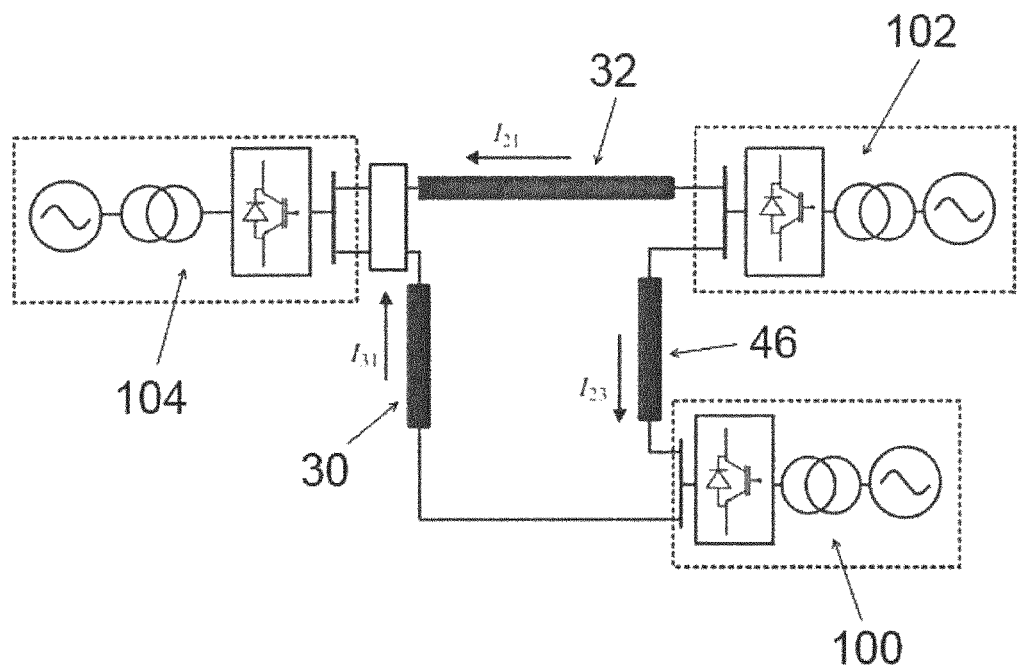

FIGS. 8 and 9 show, in schematic form, a simulation model of the current flow control circuit of FIG. 1. In the simulation model, the current flow control circuit is in the form of a meshed DC grid, a first current $I_{31}$ flows from the first element 100 into the first DC power transmission line 30, a second current $I_{21}$ flows from the second element 102 into the second DC power transmission line 32, and a third current $I_{s1}$ flows from the third terminal 40 to the third element 104. Each of the first, second and third elements 100, 102, 104 are modelled as an AC-DC converter. A further current $I_{23}$ flows in a further DC power transmission line 46 that operatively interconnects the first and second elements 100,102.

Figure 10:
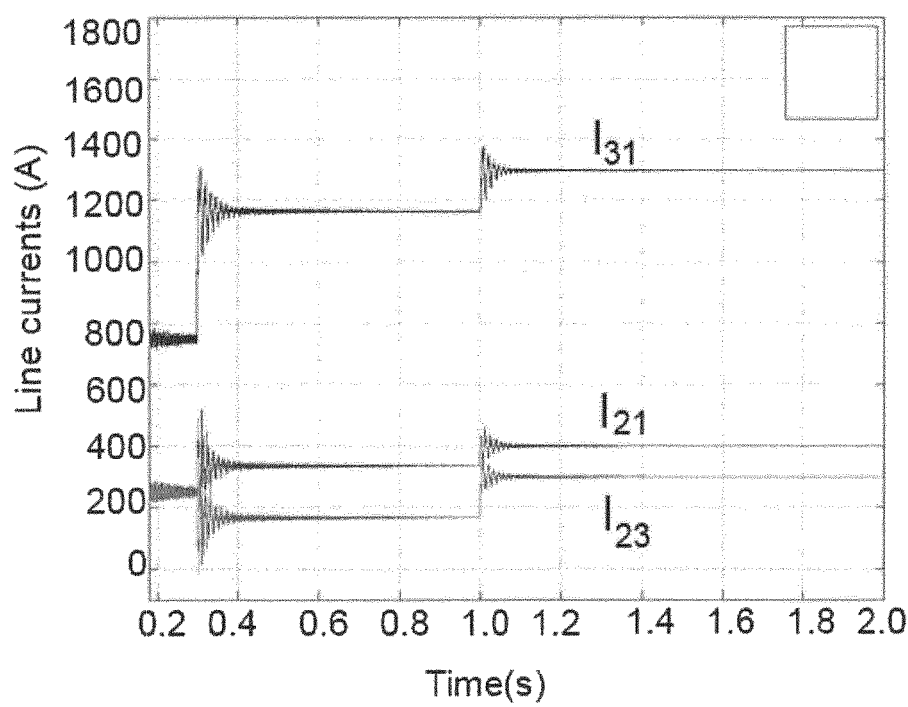
FIG. 10 illustrates, in graph form, the currents flowing in the current flow control circuit of FIG. 1 during the normal operation of the current flow control circuit as shown in FIG. 2.

FIG. 10 illustrates, in graph form, the currents $I_{31}$, $I_{21}$, $I_{23}$ flowing in the current flow control circuit during its normal operation (as shown in FIG. 2). It can be seen from FIG. 10 that step increases in power production by the first and second elements 100,102 at t=0.3 s and t=1 s results in corresponding increases in currents $I_{31}$, $I_{21}$ in the first and second DC power transmission lines 30,32, hence introducing different operating points of the current flow control circuit.

Figure 11:
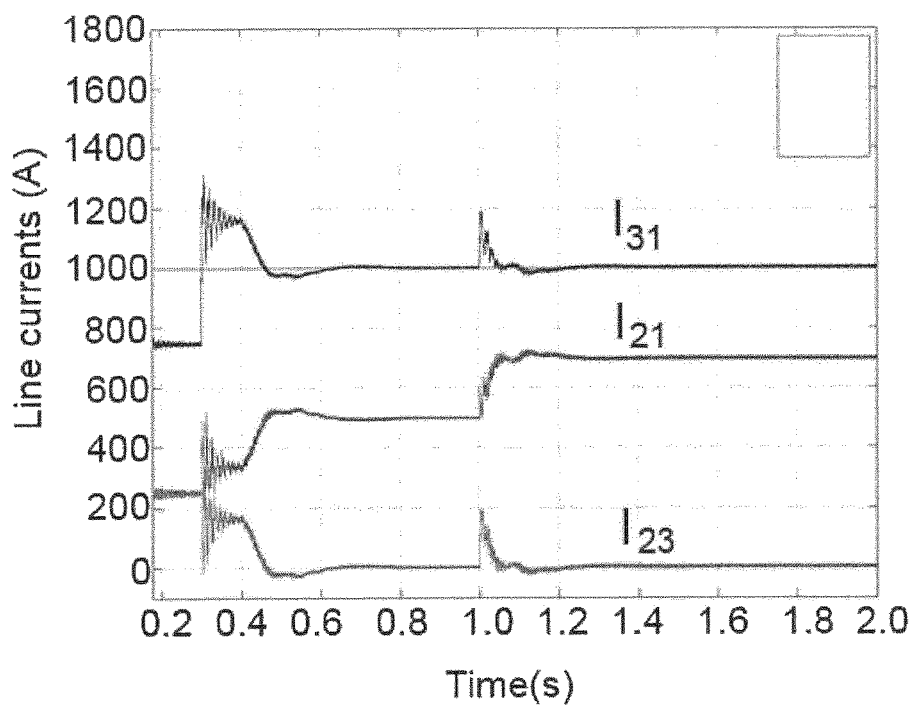
FIG. 11 illustrates, in graph form, the currents flowing in the current flow control circuit of FIG. 1 when the current flow controller is operated in an energy transfer mode.

FIG. 11 illustrates, in graph form, the currents $I_{31}$, $I_{21}$, $I_{23}$ flowing in the current flow control circuit when the current flow controller 34 is operated in an energy transfer mode from t=0.4 s onwards. It can be seen from FIG. 11 that operation of the current flow controller in the energy transfer mode from t=0.4 s onwards results in a diversion of energy from the first DC power transmission line 30 to the second DC power transmission line 32, thus reducing the current $I_{31}$ flowing in the first DC power transmission line 30 and increasing the current $I_{21}$ flowing in the second DC power transmission line 32 when compared to the corresponding currents $I_{31}$, $I_{21}$ in FIG. 10. It is shown therefore that the current flow control circuit of FIG. 1 can be operated to modify the currents $I_{31}$, $I_{21}$ flowing in the first and second DC power transmission lines 30,32.

Figure 12:
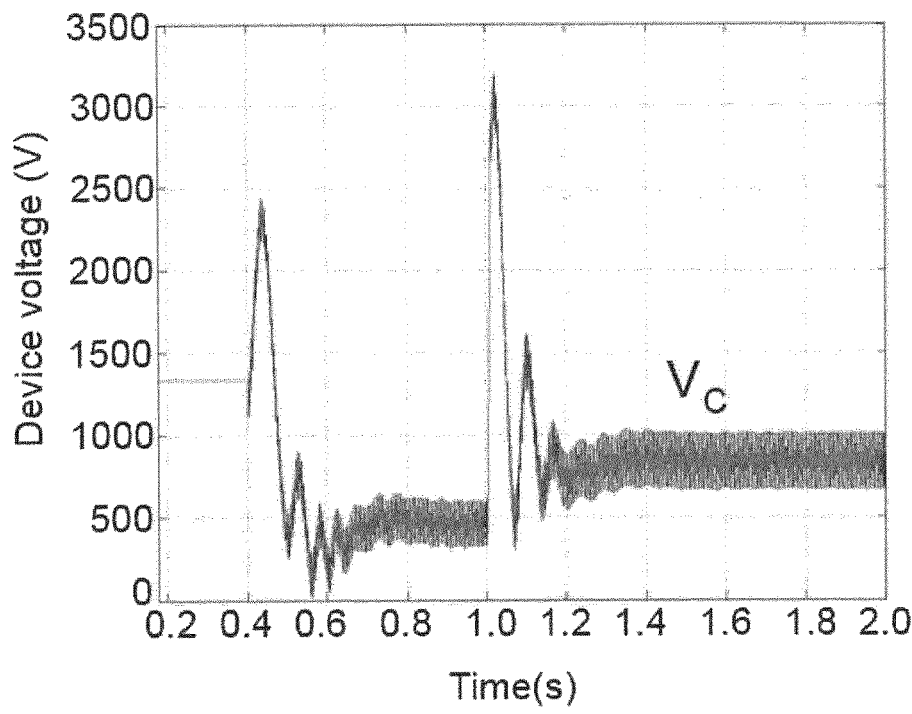
FIG. 12 illustrates, in graph form, the change in output voltage of the capacitor of the current flow control module of the current flow controller when the current flow controller is operated in an energy transfer mode.

FIG. 12 illustrates, in graph form, the change in output voltage $V_C$ of the capacitor C1 of the current flow control module 42 of the current flow controller 34 when the current flow controller 34 is operated in an energy transfer mode. It can be seen from FIG. 12 that the average output voltage $V_C$ of the capacitor C1 is maintained at a certain value after the current flow controller 34 starts operating in an energy transfer mode at t=0.4 s and after the operating point changes at t=1 s, and so the current flow controller 34 is capable of regulating the energy level of its capacitor C1 whilst being operated to modify and thereby regulate the currents $I_{31}$, $I_{21}$ flowing in the first and second DC power transmission lines 30,32.

Alternatively, instead of balancing the flows of current in the first and second DC power transmission lines 30,32, the control unit 44 in the energy transfer mode may be configured to control switching of the main and auxiliary switching elements $Q_{s1}$, $Q_{s2}$, $Q_1$, $Q_2$, $Q_3$, $Q_4$ to inject a voltage drop $V_D$, in use, in either of the DC power transmission lines 30,32 so as to divert energy from one of the first and second DC power transmission lines 30,32 into the other of the first and second DC power transmission lines 30,32 via the current flow control module 42 and thereby carry out regulation of current flow in each DC power transmission line 30,32 in order to limit the flow of current in one of the first and second DC power transmission lines 30,32; and/or reduce the flow of current in one of the first and second DC power transmission lines 30,32 to zero.

It is envisaged that, in other embodiments of the invention, the current flow controller 34 of FIG. 1 may omit the second main switching element $Q_2$. In such embodiments, the third terminal is kept electrically connected to the second terminal. Such a current flow controller 34 remains capable of being operated to inject a voltage drop, in use, in the first DC power transmission line 30 so as to divert energy from one of the DC power transmission lines 30,32 into the other of the DC power transmission lines 30,32 via the current flow control module 42 and thereby carry out regulation of current flow in each DC power transmission line 30,32. This is because keeping the electrical connection between the second and third terminals has the same effect as turning on the omitted second main switching element $Q_2$, thus permitting the current flow controller to be operated in accordance with the above-described first and third states of the main and auxiliary switching elements $Q_{s1}$, $Q_{s2}$, $Q_1$, $Q_2$, $Q_3$, $Q_4$ in the energy transfer mode.

Figure 13:
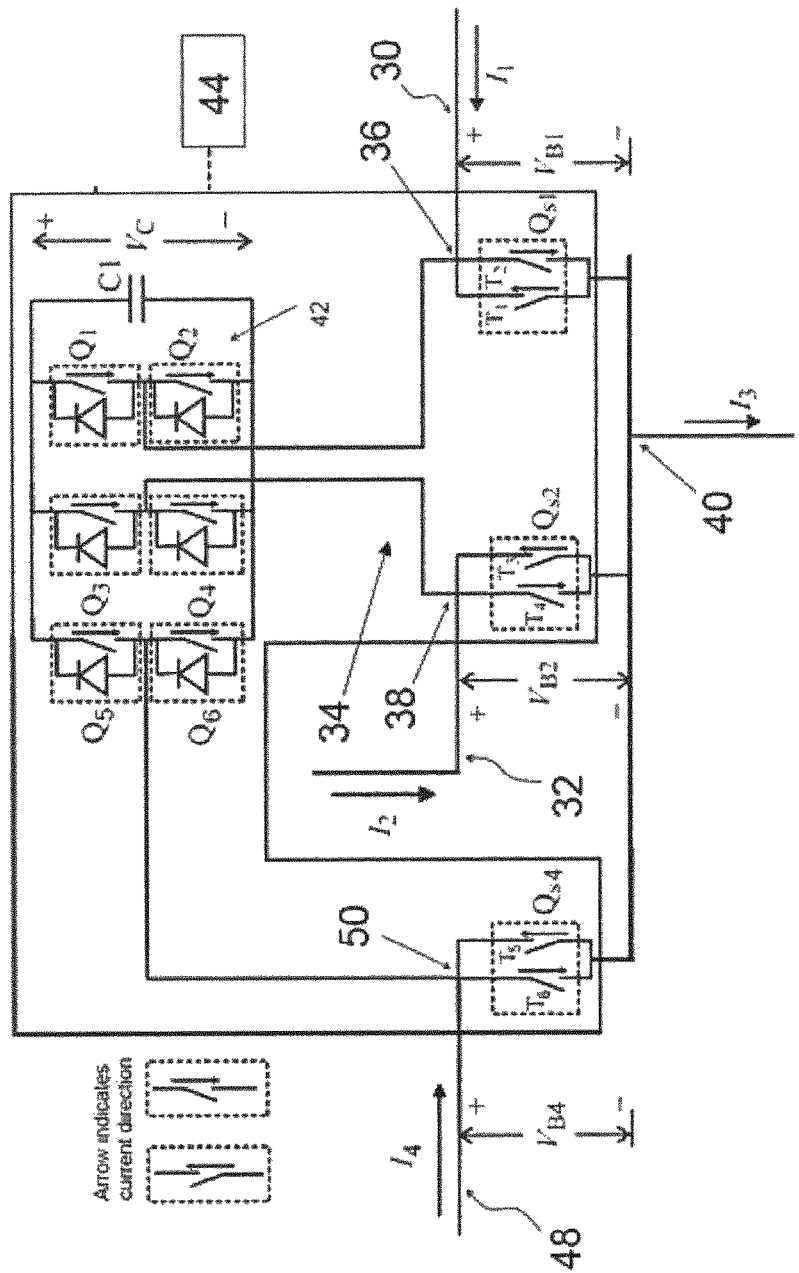
FIG. 13 shows, in schematic form, a current flow control circuit according to a second embodiment of the invention.

A current flow control circuit according to a second embodiment of the invention is shown in FIG. 13. The current flow control circuit of FIG. 13 is similar in structure and operation to the current flow control circuit of FIG. 1, and like features share the same reference numerals.

The current flow control circuit of FIG. 13 differs from the current flow control circuit of FIG. 1 in that the current flow control circuit of FIG. 13 further includes an additional DC power transmission line 48, an additional terminal 50, and an additional main switching element $Q_{s4}$.

The additional DC power transmission line 48 is operatively connected at one end to the additional terminal 50 and is operatively connected at the other end to an additional electrical element (not shown).

The third terminal 40 is electrically connected to the additional terminal 50. More specifically, in the embodiment shown, the additional main switching element $Q_{s4}$ is operatively connected between the additional and third terminals 50,40.

The additional main switching element $Q_{s4}$ is in the form of a bidirectional switching element that includes a pair of anti-parallel connected thyristors $T_5$, $T_6$. The additional main switching element $Q_{s4}$ is configured to form a short circuit upon its failure, such that failure of the additional main switching element $Q_{s4}$ does not prevent the flow of current between the third terminal 40 and the additional terminal 50.

In use, the additional main switching element $Q_{s4}$ is switchable to turn on to permit flow of current between the third terminal 40 and the additional terminal 50 and to turn off to inhibit flow of current between the third terminal 40 and the additional terminal 50.

The current flow control module 42 extends between the first, second and additional terminals 36, 38, 50. The current flow control module 42 shown in FIG. 13 is similar in structure and operation to the current flow control module 42 shown in FIG. 1, except that, in the current flow control module 42 shown in FIG. 13, the plurality of auxiliary switching elements $Q_1$, $Q_2$, $Q_3$, $Q_4$, $Q_5$, $Q_6$ are in the form of three pairs of auxiliary switching elements $Q_1$, $Q_2$, $Q_3$, $Q_4$, $Q_5$, $Q_6$ that are connected in parallel with the capacitor C1 in a bridge arrangement to define a 4-quadrant bipolar module 42 that can provide a negative, zero or positive voltage and can conduct current in two directions.

In use, the capacitor C1 of the current flow control module 42 is selectively switched into and out of circuit between the first, second and additional terminals 36, 38, 50 by changing the state of the auxiliary switching elements $Q_1$, $Q_2$, $Q_3$, $Q_4$, $Q_5$, $Q_6$.

The capacitor C1 is switched out of circuit between two or more of the first, second and additional terminals 36, 38, 50 when the auxiliary switching elements $Q_1$, $Q_2$, $Q_3$, $Q_4$, $Q_5$, $Q_6$ are configured to form a short circuit that bypasses the capacitor C1. This causes a current passing between two or more of the first, second and additional terminals 36, 38, 50 to pass through the short circuit and bypass the capacitor C1, and so in this manner the current flow control module 42 injects a zero voltage drop across at least one of: the first and second terminals 36,38; the first and additional terminals 36,50; and the second and additional terminals 38,50.

The capacitor C1 is switched into circuit between two or more of the first, second and additional terminals 36, 38, 50 when the auxiliary switching elements $Q_1$, $Q_2$, $Q_3$, $Q_4$, $Q_5$, $Q_6$ are configured to allow a current flowing between two or more of the first, second and additional terminals 36, 38, 50 to flow into and out of the capacitor C1. The capacitor C1 then charges or discharges its stored energy so as to provide a non-zero voltage drop across at least one of: the first and second terminals 36,38; the first and additional terminals 36,50; and the second and additional terminals 38,50. The auxiliary switching elements $Q_1$, $Q_2$, $Q_3$, $Q_4$, $Q_5$, $Q_6$ may be configured to switch the capacitor C1 into circuit between two or more of the first, second and additional terminals 36, 38, 50 in either forward or reverse directions so as to inject a positive or negative voltage drop across at least one of: the first and second terminals 36,38; the first and additional terminals 36,50; and the second and additional terminals 38,50.

In this manner the plurality of auxiliary switching elements $Q_1$, $Q_2$, $Q_3$, $Q_4$, $Q_5$, $Q_6$ and the capacitor C1 combine to selectively provide a voltage source, and the plurality of auxiliary switching elements $Q_1$, $Q_2$, $Q_3$, $Q_4$, $Q_5$, $Q_6$ are switchable to selectively switch the capacitor C1 into and out of circuit between the first, second and additional terminals 36, 38, 50 so as to provide a voltage drop across: the first and second terminals 36,38; the first and additional terminals 36,50; and the second and additional terminals 38,50.

The control unit 44 is configured to control switching of the main and auxiliary switching elements $Q_{s1}$, $Q_{s2}$, $Q_{s4}$, $Q_1$, $Q_2$, $Q_3$, $Q_4$, $Q_5$, $Q_6$ i.e. to turn on and off each of the main and auxiliary switching elements $Q_{s1}$, $Q_{s2}$, $Q_{s4}$, $Q_1$, $Q_2$, $Q_3$, $Q_4$, $Q_5$, $Q_6$.

The above described operation of the current flow control circuit of FIG. 1 applies mutatis mutandis to the operation of the current flow control circuit of FIG. 13.

During normal operation of the current flow control circuit, current $I_1$, $I_2$, $I_4$ flows in each of the first, second and additional DC transmission lines 30, 32, 48. The control unit 44 turns on the first, second and additional main switching elements $Q_{s1}$, $Q_{s2}$, $Q_{s4}$ to permit flow of current between the third terminal 40 and each of the first, second and additional terminals 36, 38, 50. Meanwhile the control unit 44 switches the auxiliary switching elements $Q_1$, $Q_2$, $Q_3$, $Q_4$, $Q_5$, $Q_6$ to inhibit flow of current between the first, second and additional terminals 36, 38, 50.

During transmission of power through the DC power transmission lines 30, 32, 48, at least one of the DC power transmission lines 30, 32, 48 may carry a higher current than at least one other of the DC power transmission lines 30, 32, 48 due to, for example, a variation in conductor impedance between the DC power transmission lines 30, 32, 48.

In order to carry out regulation of the current flows in the DC power transmission lines 30, 32, 48, the control unit 44 controls switching of the main and auxiliary switching elements $Q_{s1}$, $Q_{s2}$, $Q_{s4}$, $Q_1$, $Q_2$, $Q_3$, $Q_4$, $Q_5$, $Q_6$ in an energy transfer mode. More specifically, the control unit 44 in the energy transfer mode turns off at least one of the main switching elements $Q_{s1}$, $Q_{s2}$, $Q_{s4}$, turns on at least one other of the main switching elements $Q_{s1}$, $Q_{s2}$, $Q_{s4}$, and switches the capacitor C1 into circuit between at least two of the first, second and additional terminals 36, 38, 50 to inject a voltage drop across at least one of: the first and second terminals 36,38; the first and additional terminals 36,50; and the second and additional terminals 38,50. Switching of the main and auxiliary switching elements $Q_{s1}$, $Q_{s2}$, $Q_{s4}$, $Q_1$, $Q_2$, $Q_3$, $Q_4$, $Q_5$, $Q_6$ in this manner permits injection of the voltage drop in at least one of the DC power transmission lines 30, 32, 48 so as to divert energy from at least one of the DC power transmission lines 30, 32, 48 into at least one other of the DC power transmission lines 30, 32, 48 via the current flow control module 42.

The inclusion of the additional terminal 48 and the additional main switching element $Q_{s4}$ therefore not only enables the current flow controller 34 to carry out regulation of current flows in more than two DC power transmission lines 30, 32, 48, but also further increases the number of configurations of the main and auxiliary switching elements $Q_{s1}$, $Q_{s2}$, $Q_{s4}$, $Q_1$, $Q_2$, $Q_3$, $Q_4$, $Q_5$, $Q_6$ that allows the current flow controller 34 to perform the abovementioned energy diversion and current flow regulation operations, thus further enhancing the reliability of the current flow controller 34.

In this manner the current flow controller 34 of FIG. 13 is configured to form a multi-port current flow controller 34 that is capable of carrying out regulation of current flows in the first, second and additional DC power transmission lines 30, 32, 48.

It is envisaged that, in other embodiments of the invention, the number of additional terminals and/or the number of additional main switching elements may vary in order to enable the current flow controller to carry out regulation of current flows in more than one additional DC power transmission line.

It will be appreciated that the structure of the current flow control module 42 in the embodiment shown is merely chosen to illustrate the working of the invention, and that the current flow control module 42 shown in FIG. 1 may be replaced by another type of current flow control module that includes at least one auxiliary switching element and at least one energy storage device, the or each auxiliary switching element and the or each energy storage device combining to selectively provide a voltage source, the or each auxiliary switching element being switchable to selectively switch the or each energy storage device into and out of circuit between the first and second terminal.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

The invention claimed is:

1. A current flow controller comprising:
   first and second terminals being operatively connectable, in use, to first and second DC power transmission media respectively;
   a third terminal being operatively connectable, in use, to an electrical element, the third terminal being electrically connected to each of the first and second terminals;
   a main switching element, the main switching element being operatively connected between the first and third terminals, the main switching element being switchable to turn on to permit flow of current between the third terminal and the first terminal and to turn off to inhibit flow of current between the third terminal and the first terminal;
   a current flow control module extending between the first and second terminals, the current flow control module including a plurality of auxiliary switching elements connected in a bridge arrangement with at least one energy storage device, each auxiliary switching element and the or each energy storage device configured to be combined to selectively provide a voltage source, each auxiliary switching element being switchable to selectively switch the or each energy storage device into and out of circuit between the first and second terminals, wherein the plurality of auxiliary switching elements includes first and second pairs of auxiliary switching elements and includes at least one additional pair of auxiliary switching elements, and each pair of auxiliary switching elements are connected in parallel with the energy storage device in the bridge arrangement; and
   a control unit configured to control switching of the main and auxiliary switching elements in an energy transfer mode,
   wherein the control unit in the energy transfer mode is configured to turn off the main switching element and switch the or each energy storage device into circuit between the first and second terminals to inject a voltage drop, in use, in the first DC power transmission medium so as to divert energy from one of the DC power transmission media into the other of the DC power transmission media via the current flow control module and thereby carry out regulation of current flow in each DC power transmission medium.

2. The current flow controller according to claim 1, wherein the main switching element comprises a first main switching element and a second main switching elements, the first main switching element being operatively connected between the first and third terminals, the second main switching element being operatively connected between the second and third terminals, each main switching element being switchable to turn on to permit flow of current between the third terminal and the corresponding one of the first and second terminals and to turn off to inhibit flow of current between the third terminal and the corresponding one of the first and second terminals,
   wherein the control unit in the energy transfer mode is configured to turn off one of the main switching elements, turns on the other of the main switching elements and switch the or each energy storage device into circuit between the first and second terminals to inject a voltage drop, in use, in one of the DC power transmission media so as to divert energy from one of the DC power transmission media into the other of the DC power transmission media via the current flow control module and thereby carry out regulation of current flow in each DC power transmission medium.

3. The current flow controller according to claim 1, further comprising:
  at least one additional terminal being operatively connectable, in use, to an additional DC power transmission medium, the third terminal being electrically connected to the or each additional terminal,
  wherein the current flow control module extends between the first, second and additional terminals, each auxiliary switching element being switchable to selectively switch the or each energy storage device into and out of circuit between the first, second and additional terminals, and
  wherein the control unit in the energy transfer mode turns is configured to turn off the main switching element and switches the or each energy storage device into circuit between at least two of the first, second and additional terminals to inject a voltage drop, in use, in the first DC power transmission medium so as to divert energy from at least one of the DC power transmission media into at least one other of the DC power transmission media via the current flow control module and thereby carry out regulation of current flow in each DC power transmission medium.

4. The current flow controller according to claim 3, further comprising:
  at least one additional main switching element, the or each additional main switching element being operatively connected between the third terminal and the corresponding additional terminal, the or each additional main switching element being switchable to turn on to permit flow of current between the third terminal and the corresponding additional terminal and to turn off to inhibit flow of current between the third terminal and the corresponding additional terminal,
  wherein the control unit in the energy transfer mode is configured to turn off at least one of the main switching elements, turns on at least one other of the main switching elements and switch the or each energy storage device into circuit between at least two of the first, second and additional terminals to inject a voltage drop, in use, in at least one of the DC power transmission media so as to divert energy from at least one of the DC power transmission media into at least one other of the DC power transmission media via the current flow control module and thereby carry out regulation of current flow in each DC power transmission medium.

5. The current flow controller according to claim 1, wherein the control unit, when in the energy transfer mode, is configured to control switching of the main and auxiliary switching elements to selectively charge and discharge the or each energy storage device and thereby regulate an energy level of the or each energy storage device.

6. The current flow controller according to claim 1, wherein the current flow control module includes a plurality of auxiliary switching elements and an energy storage device, and the plurality of auxiliary switching elements are connected in parallel with the energy storage device in a full-bridge arrangement to define a 4-quadrant bipolar module that can provide a negative, zero or positive voltage and can conduct current in two directions.

7. The current flow controller according to claim 1, wherein the current flow control module includes a plurality of auxiliary switching elements and an energy storage device, and the plurality of auxiliary switching elements are connected in parallel with the energy storage device in a half-bridge arrangement to define a 4-quadrant bipolar module that can provide a negative, zero or positive voltage and can conduct current in two directions.

8. The current flow controller according to claim 1, wherein the or each main switching element includes at least one force-commutated switching device, and the control unit is configured to control switching of each auxiliary switching element of the current flow control module to perform forced commutation of the or each force-commutated switching device in the or each main switching element.

9. The current flow controller according to claim 1, wherein the or each main switching element is a bidirectional switching element.

10. A current flow control circuit comprising:
  first and second DC power transmission media for connection to an electrical element or to respective electrical elements; and
  a current flow controller according to claim 1,
  wherein the first and second terminals are operatively connected, in use, to the first and second DC power transmission media respectively.

11. The current flow controller according to claim 1, wherein the bridge arrangement is a full bridge or a half bridge arrangement.

12. The current flow controller according to claim 6, wherein the plurality of auxiliary switching elements includes first and second pairs of auxiliary switching elements and includes at least one additional pair of auxiliary switching elements, and each pair of auxiliary switching elements are connected in parallel with the energy storage device in the bridge arrangement.

* * * * *